US006624530B1

United States Patent
Toulon

(12) United States Patent
(10) Patent No.: US 6,624,530 B1
(45) Date of Patent: Sep. 23, 2003

(54) PORTABLE WIND-POWERED LIGHT

(76) Inventor: Daniel Toulon, 48 Bis Rue Gambetta, St. Just St. Rambetta S/Loire (FR), 42170

(*) Notice: Subject to any disclaimer, the term of this patent is extended or adjusted under 35 U.S.C. 154(b) by 38 days.

(21) Appl. No.: 10/015,244

(22) Filed: Dec. 12, 2001

(51) Int. Cl.[7] .................................................. F03D 9/00
(52) U.S. Cl. ........................................... 290/55; 290/44
(58) Field of Search ................................ 290/1 R, 1 A, 290/44, 43, 54, 55

(56) References Cited

U.S. PATENT DOCUMENTS 4,805,329 A * 2/1989 Tsai ............................. 40/550
5,656,865 A * 8/1997 Evans .......................... 290/55
5,920,127 A * 7/1999 Damron et al. ................ 290/44
6,246,125 B1 * 6/2001 Axtell .......................... 290/1 A

* cited by examiner

Primary Examiner—Nicholas Ponomarenko
(74) Attorney, Agent, or Firm—Goldstein & Lavas, P.C.

(57) ABSTRACT

A portable wind powered light that can be attached to a moving object or the like to allow generated wind to illuminate a light source. The light includes a generator disposed interiorly of a protective cylindrical housing. The housing has a first end, a second end, and a cylindrical side wall therebetween. A propeller is coupled with the first end of the cylindrical housing. The propeller is operably coupled with the generator. A support arm extends outwardly from the second end of the cylindrical housing. A light source is coupled with the support arm. The light source is in communication with the generator.

4 Claims, 2 Drawing Sheets

PORTABLE WIND-POWERED LIGHT

BACKGROUND OF THE INVENTION

The invention relates to a portable wind powered light that can be attached to a moving object or the like to allow generated wind to illuminate a light source.

People who are driving their bicycles or working in their gardens often require the assistance of a light source to aid them in their endeavour. Because these activities are participated in outdoors, the lack of a reliable power source is typically a problem. Most of these light sources utilize batteries as a power source. Often, however, batteries have proven to be unreliable, alternate power source is necessary to power these light sources.

The present invention attempts to solve the abovementioned problem by providing a portable light source that uses a wind-powered generator to provide a power to a light source.

Several references show various light sources that are portable for use in a plurality of locations and for a plurality of uses.

While these units may be suitable for the particular purpose employed, or for general use, they would not be as suitable for the purposes of the present invention as disclosed hereafter.

SUMMARY OF THE INVENTION

It is an object of the invention to produce a portable wind powered light that can be attached to a moving object or the like to allow generated wind to illuminate a light source including a generator disposed interiorly of a protective cylindrical housing. The housing has a first end, a second end, and a cylindrical side wall therebetween. A propeller is coupled with the first end of the cylindrical housing. The propeller is operably coupled with the generator. The propeller includes a plurality of vanes extending outwardly from a rotatable main member. A support arm extends outwardly from the second end of the cylindrical housing. The support arm includes an inner portion in a co-linear relationship with the cylindrical housing. The support arm includes an outer portion extending angularly from the inner portion. A light source is coupled with the outer portion of the support arm. The light source is in communication with the generator. A clip member is adapted for coupling with a tubular object. The clip member has an extension arm extending upwardly therefrom. The extension arm has a free upper end secured to the cylindrical side wall of the cylindrical housing.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
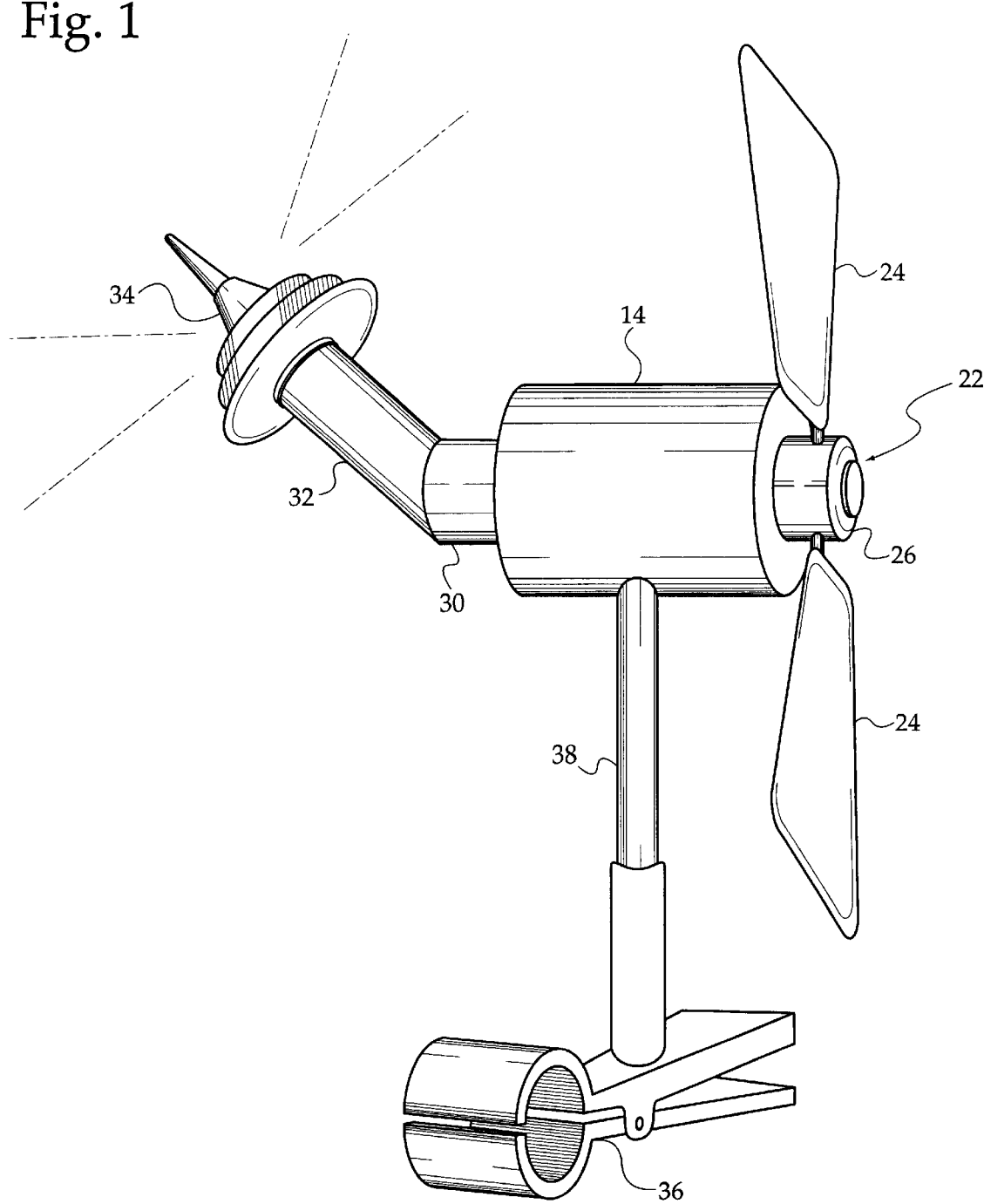
FIG. 1 is a perspective view of the present invention.
Figure 2:
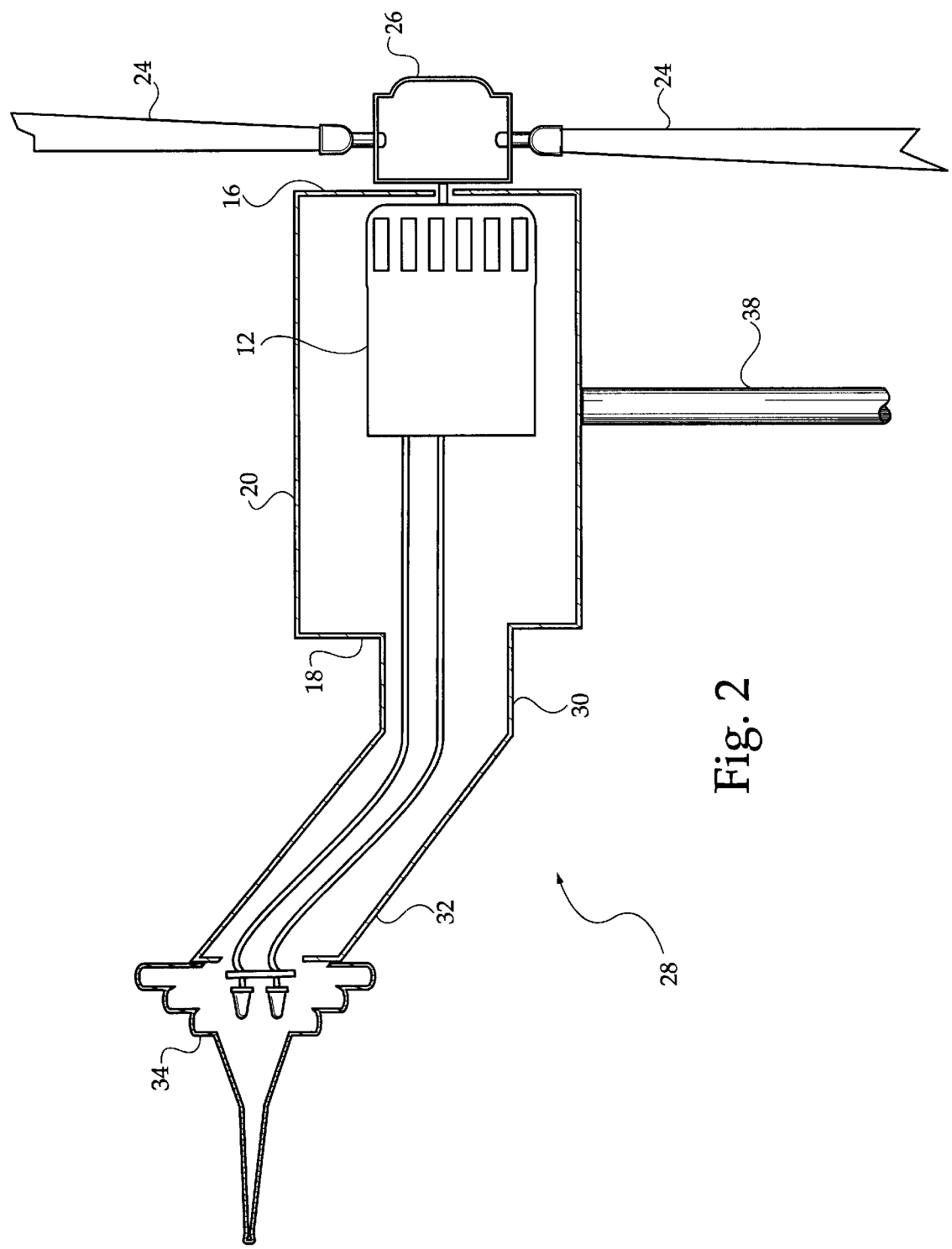
FIG. 2 is a cross-sectional side view of the present invention.

It will be noted in the various figures that the device relates to a portable wind powered light that can be attached to a moving object or the like to allow generated wind to illuminate a light source. In its broadest context, the device consists of a generator, a propeller, a support arm, a light source, and a clip member. Such components are individually configured and correlated with respect to each other so as to attain the desired objective.

The generator 12 is disposed interiorly of a protective cylindrical housing 14. The housing 14 has a first end 16, a second end 18, and a cylindrical side wall 20 therebetween.

The propeller 22 is coupled with the first end 16 of the cylindrical housing 14. The propeller 22 is operably coupled with the generator 12. The propeller 22 includes a plurality of vanes 24 extending outwardly from a rotatable main member 26.

The support arm 28 extends outwardly from the second end 18 of the cylindrical housing 14. The support arm 28 includes an inner portion 30 in a co-linear relationship with the cylindrical housing 14. The support arm 28 includes an outer portion 32 extending angularly from the inner portion 30.

The light source 34 is coupled with the outer portion 32 of the support arm 28. The light source 34 is in communication with the generator 12. Thus, when the propeller 22 is rotating sufficiently, the generator 12 will be activated to cause the light source 34 to be illuminated.

The clip member 36 is adapted for coupling with a tubular object. In the preferred embodiment, the clip member 36 will allow the present invention to be secured to a handle bar area of a bicycle. The clip member 36 has an extension arm 38 extending upwardly therefrom. The extension arm 38 has a free upper end secured to the cylindrical side wall 20 of the cylindrical housing 14.

What is claimed is:

1. A portable wind powered light that can be attached to a moving object or the like to allow generated wind to illuminate a light source, comprising, in combination:

a generator disposed interiorly of a protective cylindrical housing, the housing having a first end, a second end, and a cylindrical side wall therebetween;

a propeller coupled with the first end of the cylindrical housing, the propeller being operably coupled with the generator, the propeller including a plurality of vanes extending outwardly from a rotatable main member;

a support arm extending outwardly from the second end of the cylindrical housing, the support arm including an inner portion in a co-linear relationship with the cylindrical housing, the support arm including an outer portion extending angularly from the inner portion;

a light source coupled with the outer portion of the support arm, the light source being in communication with the generator; and a clip member adapted for coupling with a tubular object, the clip member having an extension arm extending upwardly therefrom, the extension arm having a free upper end secured to the cylindrical side wall of the cylindrical housing.

2. A portable wind powered light that can be attached to a moving object or the like to allow generated wind to illuminate a light source, comprising, in combination:

a generator disposed interiorly of a protective cylindrical housing, the housing having a first end, a second end, and a cylindrical side wall therebetween;

a propeller coupled with the first end of the cylindrical housing, the propeller being operably coupled with the generator;

a support arm extending outwardly from the second end of the cylindrical housing; and a light source coupled with the support arm, the light source being in communication with the generator.

3. The portable wind powered light as set forth in claim 2, wherein the support arm includes an inner portion in a co-linear relationship with the cylindrical housing, the support arm including an outer portion extending angularly from the inner portion.

4. The portable wind powered light as set forth in claim 2, and further including a clip member adapted for coupling with a tubular object, the clip member having an extension arm extending upwardly therefrom, the extension arm having a free upper end secured to the cylindrical side wall of the cylindrical housing.

* * * * *